United States Patent
Kachouh

[11] Patent Number: 6,114,821
[45] Date of Patent: Sep. 5, 2000

[54] ELECTRIC MOTOR-DRIVEN SERVO-DRIVE FOR A MOTOR VEHICLE LOCK

[75] Inventor: Checrallah Kachouh, Dortmund, Germany

[73] Assignee: Robert Bosch GmbH, Stuttgart, Germany

[21] Appl. No.: 09/357,804

[22] Filed: Jul. 20, 1999

[30] Foreign Application Priority Data

Jul. 21, 1998 [DE] Germany .......................... 198 32 749

[51] Int. Cl.[7] .................................................. G05B 5/00
[52] U.S. Cl. .................................................... 318/466
[58] Field of Search ................................ 318/466, 685, 318/696, 3, 9–10

[56] References Cited

U.S. PATENT DOCUMENTS

| | | | |
|---|---|---|---|
| 4,272,112 | 6/1981 | Schlick et al. | 292/201 |
| 4,762,348 | 8/1988 | Matsumoto | 292/201 |
| 4,850,625 | 7/1989 | Hori et al. | 292/336.3 |
| 5,240,296 | 8/1993 | Kobayashi . | |
| 5,762,384 | 6/1998 | Bartel | 292/216 |

FOREIGN PATENT DOCUMENTS

| | | |
|---|---|---|
| 43 34 522 | 1/1995 | Germany . |
| 44 33 042 | 10/1995 | Germany . |

*Primary Examiner*—Bentsu Ro
*Assistant Examiner*—Rina I. Duda
*Attorney, Agent, or Firm*—Nixon Peabody LLP; David S. Safran

[57] ABSTRACT

An electric motor-driven servo-drive for a motor vehicle lock, with an electric drive motor (1), with a servo-drive disk (3) or other servo-drive element which is driven by the electric drive motor (1), with an operating lever (4) which can be moved back and forth by the servo-drive element (3) between at least two operating positions (I, II) or another mechanical switching element, and with an electric motor control (6) with which the electric drive motor (1) can be turned on and in a predetermined free position (X) of the servo-drive element (3) and with simultaneous occurrence of the operating position (I) of the switching element (4) can be turned off, especially short circuited, there being an electrical or electronic switch (7) and its being connected to the electric motor control (6) and the switch (7) automatically assuming a first position ("0") and influenced by the influencing element a second position ("1"). Only a single electric switch (7) is mechanically arranged such that it can be switched into the second position ("1") both by the servo-drive element (3) and also by the switching element (4). The servo-drive element (3) in its free position (X) and the switching element (4) in its first operating position (I) do not influence the switch (7), and the electric drive motor (1) is turned off, especially short circuited, when the switch (7) is not influenced.

2 Claims, 2 Drawing Sheets

ELECTRIC MOTOR-DRIVEN SERVO-DRIVE FOR A MOTOR VEHICLE LOCK

BACKGROUND OF THE INVENTION

1. Field of the Invention

The subject of the invention is an electric motor-driven servo-drive for a motor vehicle lock with an electric drive motor, a servo-drive disk or other servo-drive element which is driven by the electric drive motor, with an operating lever which can be moved back and forth by the servo-drive element between at least two operating positions or another mechanical switching element, and with an electric motor control with which the electric drive motor can be turned on, and which, in a certain free position of the servo-drive element and with simultaneous occurrence of the operating position of the switching element, can be turned off, especially short circuited, there being an electrical or electronic switch which is connected to the electric motor control, which automatically assumes a first position and is influenced by an influencing element into a second position.

2. Description of Related Art

Motor vehicle locks in this sense can be used in many areas, especially as motor vehicle side door locks, rear door locks, rear hatch locks, sliding door locks, hood locks, and the like. In this sense, the term motor vehicle door lock should therefore be understood comparatively comprehensively. In this patent application, the servo-drive disk is described as a servo-drive element, use of all other types of servo-drive elements, for example, also spindle drives, is possible and should also be encompassed by the term servo-drive element. Broad freedom likewise applies to the switching element which is described here as a mechanical operating lever, but which can be a linearly shifted switching element, a swiveling switching element, or also a rotating switching element.

In electric motor-driven servo-drives for motor vehicle locks known from practice, two electrical or electronic switches are connected to the electric motor control, specifically one switch for the servo-drive element and the second switch for the operating lever (U.S. Pat. No. 5,240,296). In the sense of a series connection of the two switches which leads, in terms of computer engineering, to an AND gate, the electric drive motor is turned off when the two switches are activated. Generally, the electric drive motor is turned off by short circuiting it in order to achieve a motor braking action, and thus, rapid shutdown of the servo-drive element (see also German Patent No. 43 34 522).

SUMMARY OF THE INVENTION

A primary object of the invention is to reduce the circuit engineering cost in the above described electric motor-driven servo-drive for a motor vehicle lock.

This described object is achieved in an electric motor-driven servo-drive for a motor vehicle lock of the initially mentioned type by there being only one electric switch which is mechanically arranged such that it can be switched into its second position both by the servo-drive element and also by the switching element; and by the servo-drive element in its free position and the switching element in its first operating position not influencing the switch, the electric drive motor being turned off when the switch is not influenced, especially short circuited.

In accordance with the invention, a mathematical relation has been used, specifically the De Morgan theorem which indicates how a mathematical AND operation can be replaced by a mathematical OR operation and vice versa. The equation and the table for it are given in the "Detailed Description" part of the specification, below.

It has been recognized in accordance with the invention that the De Morgan theorem can be used in an electric motor-driven servo-drive for a motor vehicle lock of the type under consideration to save one electrical or electronic switch by mechanically supplying a "negation" to the elements which influence the switch, therefore the servo-drive element and the switching element, by correspondingly "negating" the influence on the switch.

The electrical or electronic switch can be first of all a microswitch with a first position which is assumed under a spring load and a second position which is reached against the spring load, but can also be proximity, electromagnetic or electronic switches (Reed relays, Hall sensor switches, etc.). Here, there are a host of possibilities which can be taken from the prior art and which will not be explained individually here.

In the implementation of the teaching of the invention, as a result, there occurs a negated AND operation which can be used in the corresponding configuration of the motor control for the described turning off of the electric drive motor. In another configuration, exactly the desired AND operation arises which in the motor control then acts in terms of circuit engineering like the series connection of two individual switches which has long been accomplished.

In the following the invention is explained in detail using the drawings which represent a single embodiment.

BRIEF DESCRIPTION OF THE INVENTION

FIG. 1 shows an embodiment of an electric motor-driven servo-drive with an electromechanical switch which is arranged and in accordance with the invention, and with the servo-drive overall being in a "locked-antitheft" position;

FIG. 2 a view corresponding to that of FIG. 1, but with the servo-drive in the "unlocked" position;

DETAILED DESCRIPTION OF THE INVENTION

Figure 4A:
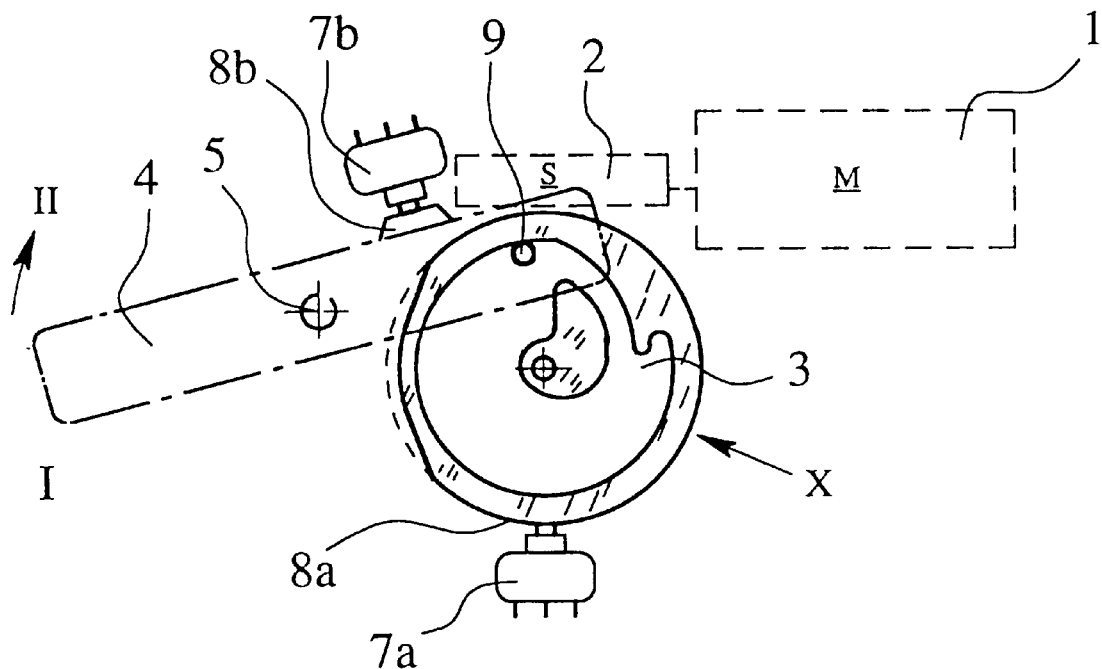
FIG. 4a shows an electric motor-driven servo-drive with a motor control of the prior art with a series connection of two electrical switches and FIG. 4b an electrical circuit diagram thereof.

The basic principle of an electric motor-driven servo-drive of the type under consideration will first be explained using FIGS. 4a & 4b. In FIG. 4a, an electric motor-driven servo-drive for a motor vehicle lock, for example a motor vehicle rear door lock, is shown, but which is subject to the corresponding alternatives already explained in the "Background" part of this specification, to which reference should be made. An electric drive motor 1 is shown which drives a worm 2 or a spindle which, in turn, drives a servo-drive element which is shown here, by way of example only, as a servo-drive disk 3 or a worm wheel. In the general part of the specification it has likewise already been pointed out the numerous other forms of servo-drive elements which can be used here.

An operating 4, can be moved back and forth by the servo-drive element 3 between at least two operating positions I, II, and it is pivotally mounted on a bearing axle 5 to enable this movement. Lever 4 can also be another type of mechanical switching element, for example, a slide or rotary part.

Figure 4B:
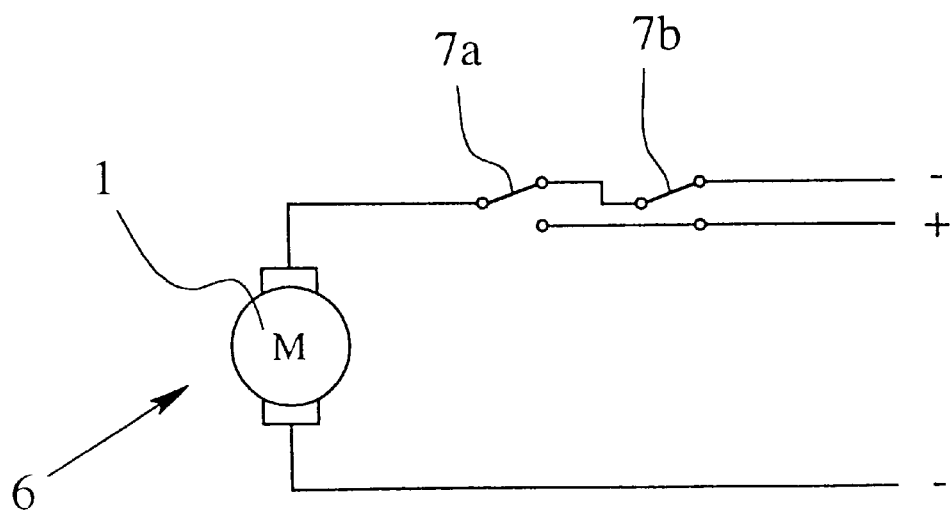

FIG. 4b shows an electric motor control 6 for controlling of the electric drive motor 1 and with which the electric drive motor 1 can be turned on, and with which, in a certain free position X of the servo-drive element 3 and with simultaneous occurrence of the operating position I of the switching element 4 shown in FIG. 4a, can be turned on. In the prior art embodiment in FIG. 4a, there are two switches 7a, 7b for this purpose; they are connected to the electric motor control 6 which is shown in FIG. 4b. Each of the switches 7 automatically assumes a first position "0" and is influenced by an influencing element into a second position "1". In this embodiment, this is achieved by the switches 7 each being spring loaded and having the capacity to be actuated by a control cam 8a on the servo-drive element 3 or a control cam 8b on the operating lever 4 against the spring loading force.

In another embodiment of the switches 7, they can be actuated without contact by installing corresponding magnetic bodies in the influencing elements, i.e., the servo-drive element 3 and the switching element 4. This is widely known from the prior art and reference can be made to the published German Patent Application DE - A - 44 33 042 for an example of such an arrangement.

It is shown in FIG. 4b, that the two series connected contacts of the switches 7a and 7b lead to a short circuiting of the electric drive motor 1 occurring only when the two switches 7a and 7b are activated. This is the case when the position of the servo-drive element 3 and of the operating lever 4 shown in FIG. 4a is reached. This position corresponds to the "locked" position of the motor vehicle door lock, a position in the "free space" between an "unlocked" end position and an "locked anti-theft" end position. The two end positions are reached in this example by servo-drive element 3 running against the journal 9 on the operating lever 4 (blocking mode; evaluation of the increased power consumption of the electric drive motor or time-out). Also here, there are various models in the prior art to which reference should be made in this regard.

For the circuit engineering in accordance with the present invention which makes it possible to eliminate one entire switch with the same circuit engineering result, the above mentioned De Morgan theorem is important. It reads $$\overline{A \cdot B} = \overline{A} + \overline{B}$$

where the multiplication sign representing the AND operation and the addition sign + represents the OR operation from computer engineering. The bar over the letter always means the corresponding quantity is used in negation, i.e., is negated.

Otherwise the De Morgan theorem furthermore also means $$A \cdot B = \overline{\overline{A} + \overline{B}}$$

it becoming clear therefrom that doubled negation ultimately leads to a final correct AND operation.

An electrical switch 7 of the aforementioned type can also be activated by two influencing elements. If only one of the influencing elements activates one such switch 7, it always assumes the second position "1", regardless of whether the second influencing element activates it or not. If "0" is always defined as noninfluence and "1" as influence and "A" is defined as the servo-drive element 3 and "B" as the switching element 4, the use of a single switch 7 which is influenced both by the servo-drive element 3 and also the switching element 4 yields the following:

| A(3) | B(4) | A + B(7) | A · B | $\overline{A \cdot B}$ |
|---|---|---|---|---|
| 0 | 0 | 0 | 0 | 1 |
| 0 | 1 | 1 | 0 | 1 |
| 1 | 0 | 1 | 0 | 1 |
| 1 | 1 | 1 | 1 | 0 |

| $\overline{A}$(3) | $\overline{B}$(4) | $\overline{A} + \overline{B}$ | $\overline{A} + \overline{B}$ |
|---|---|---|---|
| 1 | 1 | 1 | 0 |
| 1 | 0 | 1 | 0 |
| 0 | 1 | 1 | 0 |
| 0 | 0 | 0 | 1 |

It can thus be seen that one switch behaves like an OR gate. According to the De Morgan theorem this becomes a negated AND gate when the negated input quantities are used in both cases.

According to the teaching of the invention, it is therefore provided that there is only one electric switch 7 and this one switch 7 is mechanically arranged such that it can be switched into the second position "1" both by the servo-drive element 3 and also by the switching element 4, and that the servo-drive element 3 in its certain position X and the switching element 4 in its first operating position I, do not influence the switch 7. This noninfluence, mechanically expressed, represents the demand for "negation" of the input quantity. Now, it can only be provided that the electric drive motor 1 is turned off when the switch 7 is not influenced, especially therefore short circuited, then the desired negated AND gate is re-positioned in circuitry terms according to the first formula given above with a single switch 7.

The above second truth table indicates what happens when it is provided in terms of circuit engineering that the output signal of the switch 7 is inverted and only then is it processed by the circuitry. Comparison with the next to last column of the first truth table shows that the result of re-inversion, which reverses a computer engineering negation by circuitry, leads to the result corresponding to an AND operation of the input quantities, and thus, exactly to replacement of the second switch of the prior art.

Figure 1:
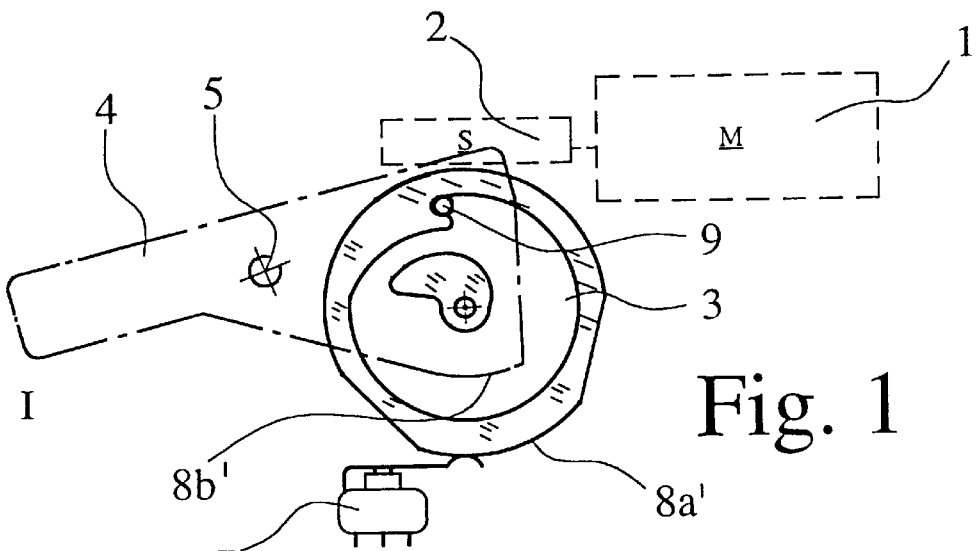
Figure 2:
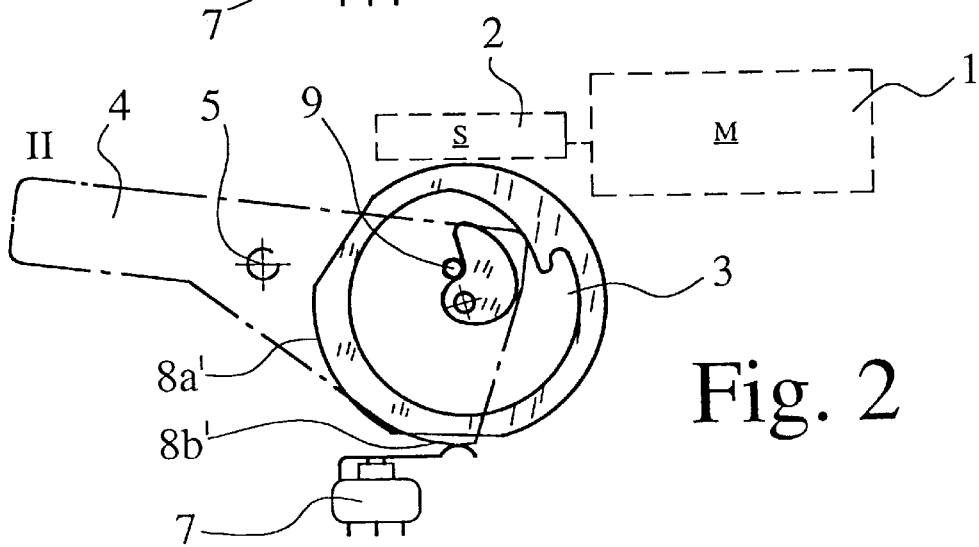
Figure 3:
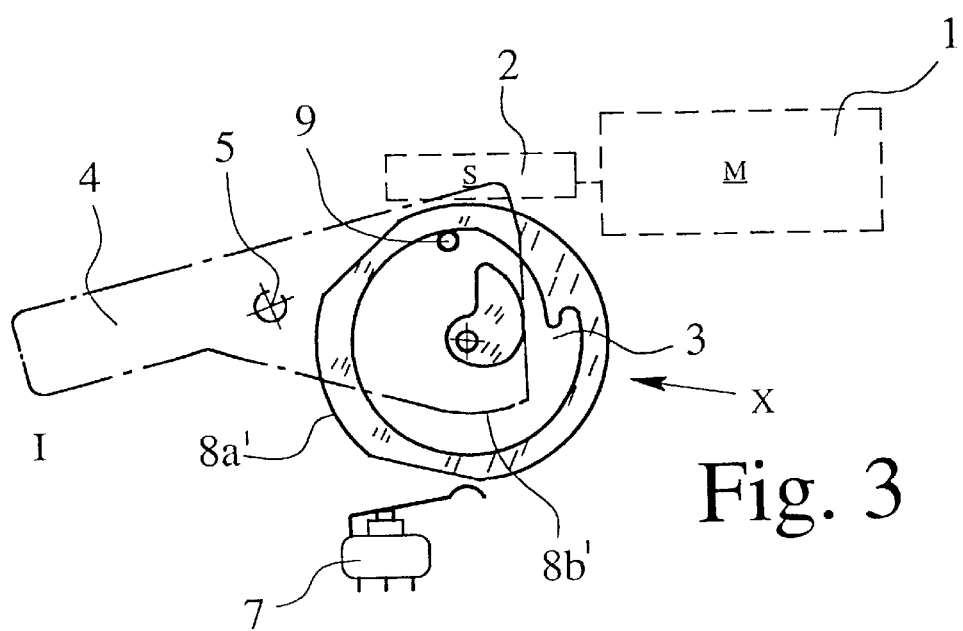
FIG. 3 is another view corresponding to that of FIG. 1, but with the servo-drive in the "locked" position, but not the antitheft position.

It is decisive overall that "negated" activation of the switch 7 is used. In an electromechanical switch, this means implementation of a "complementary" control crank. This is easily apparent in FIGS. 1, 2, and 3. The complementary control cranks is thus the control crank 8a' for the servo-drive element 3 and 8b' for the operating lever 4. The latter has been simply widened on the "opposite side." The corresponding arrangements can be accomplished for the likewise useful proximity electronic switch.

With the design in accordance the invention one complete switch (microswitch or other sensor) is saved with the corresponding saving of associated costs (procurement, wiring, assembly, handling, storage, etc.). Likewise, increased reliability results because there is one less switch that can fail, so that the failure probability is therefore roughly cut in half. Moreover, all of these benefits are achieved without additional cost, simply by an intelligent circuit engineering evaluation.

Instead of the first operating position I of the switching element 4, of course, the second operating position II, or another operating position provided in addition, can be selected. The corresponding also applies to other positions, especially those of the servo-drive element 3 which are assumed here.

What is claimed is:

1. Electric motor-driven servo-drive for a motor vehicle lock, with an electric drive motor, a servo-drive element in driven connection with the electric drive motor, an operating lever which is movable back and forth between at least two operating positions by an influencing element comprising one of the servo-drive element and a mechanical switching element, and an electric motor control for turning on and off the electric drive motor, the motor control having a single electrical or electronic switch which, in a predetermined free position of the servo-drive element and with simultaneous occurrence of the operating position of the switching element, turns off the drive motor, the switch automatically assuming a first position and being influenced by said influencing element into a second position; wherein the single electrical or electronic switch is mechanically arranged relative to the servo-drive element and the switching element in a manner which is switchable into the second position both by the servo-drive element and also by the switching element; and wherein the servo-drive element in said free position and the switching element in its first operating position do not influence the switch, the electric drive motor being turned off when the switch is not influenced.

2. Electric motor-driven servo-drive as claimed in claim 1, wherein the said control has means for inverting and then processing an output signal of the single electrical or electronic switch.

* * * * *